United States Patent [19]
Dola et al.

[11] 4,021,604
[45] May 3, 1977

[54] FLEXIBLE CONDUIT CONNECTOR

[75] Inventors: Frank Peter Dola, Port Richey; Frederick William Rossler, Jr., New Port Richey, both of Fla.

[73] Assignee: AMP Incorporated, Harrisburg, Pa.

[22] Filed: Apr. 14, 1975

[21] Appl. No.: 567,792

[52] U.S. Cl. .............................. 174/51; 174/65 R; 285/162

[51] Int. Cl.² ..................... H02G 3/06; H02G 3/08

[58] Field of Search ........... 174/65 R, 51; 285/162, 285/158, 189, 319; 403/201, 299, 329; 339/14 R, 126 R, 128

[56] References Cited

UNITED STATES PATENTS

| | | | |
|---|---|---|---|
| 1,830,250 | 11/1931 | Tiefenbacher | 285/162 |
| 2,810,009 | 10/1957 | Pryne | 174/51 |
| 3,183,297 | 5/1965 | Curtiss | 174/65 R |
| 3,221,572 | 12/1965 | Swick | 285/162 X |
| 3,340,497 | 9/1967 | Balint | 339/128 X |
| 3,354,422 | 11/1967 | Duris | 339/128 |
| 3,493,918 | 2/1970 | Van Niel | 339/128 |
| 3,746,373 | 7/1973 | Prudente | 285/162 |
| 3,814,467 | 6/1974 | Van Buren | 174/65 X |
| 3,858,151 | 12/1974 | Paskert | 174/51 X |

*Primary Examiner*—J. V. Truhe
*Assistant Examiner*—David A. Tone
*Attorney, Agent, or Firm*—Robert W. Pitts; Frederick W. Raring; William J. Keating

[57] ABSTRACT

A connector for affixing a flexible conduit having external helical grooves to an electrical junction box is disclosed. The connector comprises a stamped and formed metallic retaining clip in conjunction with a rigid housing. The clip engages the helical grooves and also establishes contact with a circular hole in one face of the junction box. Both a secure mechanical and electrical connection are established so that the metallic conduit and the metallic junction box can serve as a continuous electrical ground. A straight-through and a right angle version of the connector are disclosed. The retaining clip is mounted in the housing so that the connector snaps into the circular hole and can be removed without damage.

10 Claims, 9 Drawing Figures

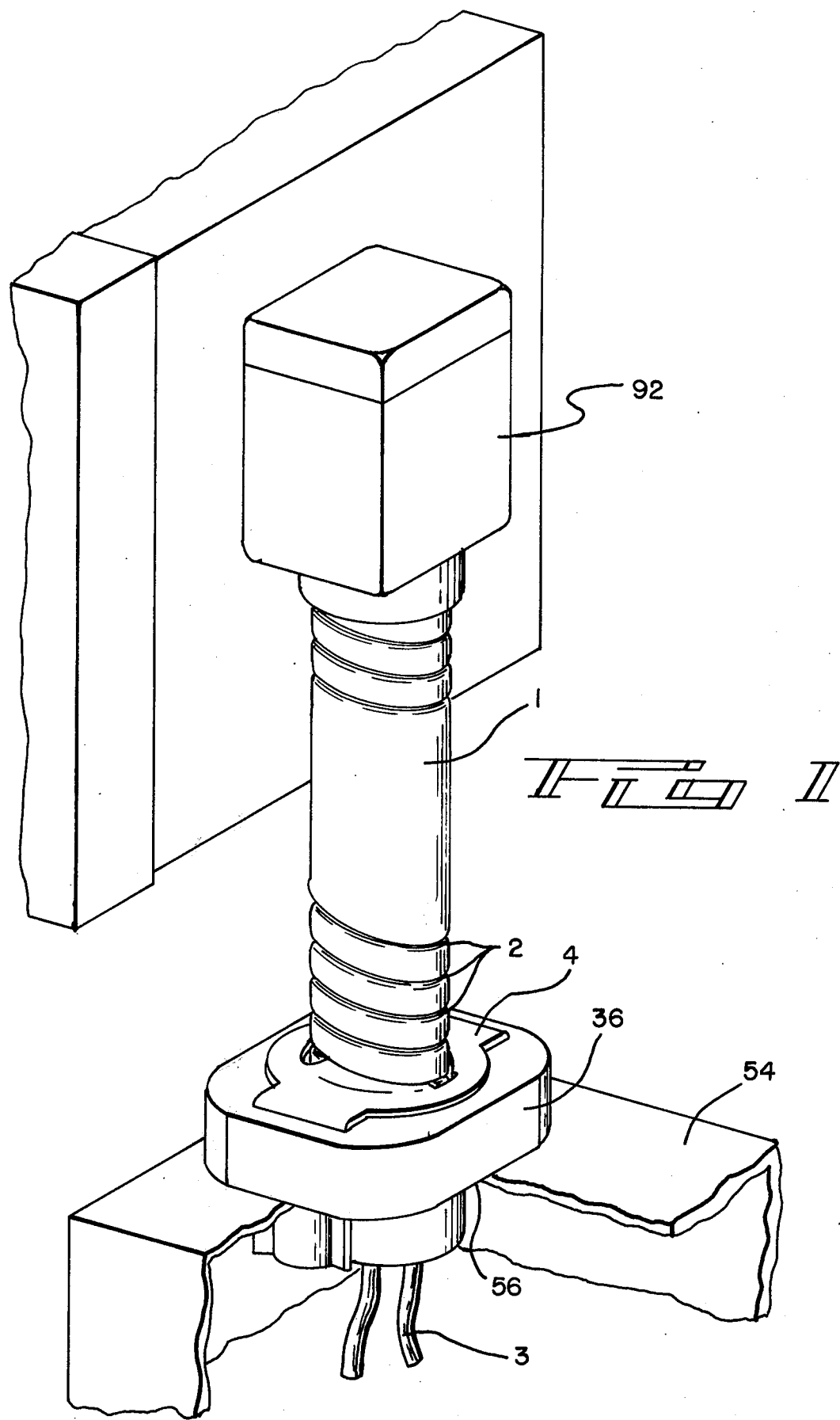

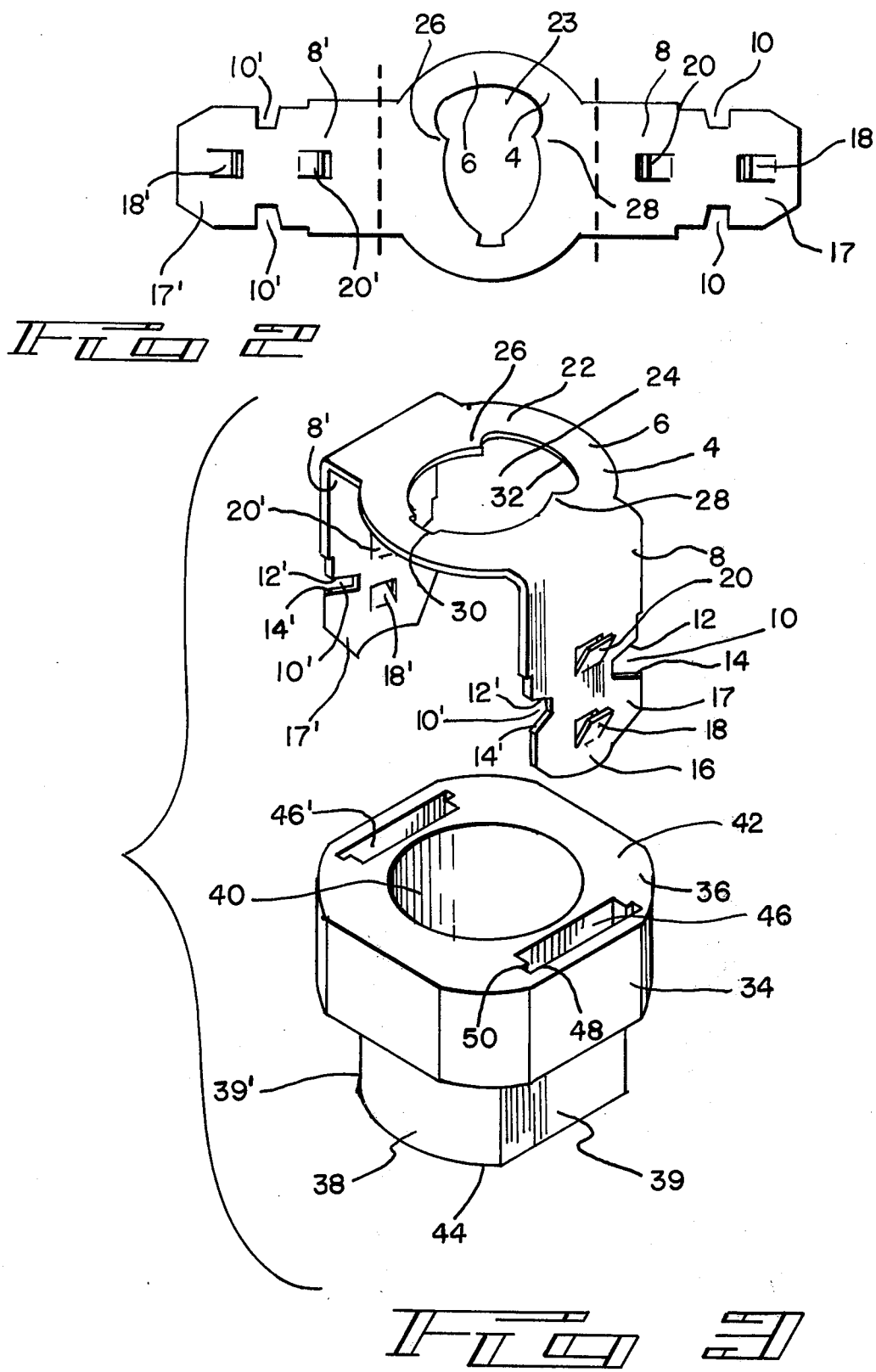

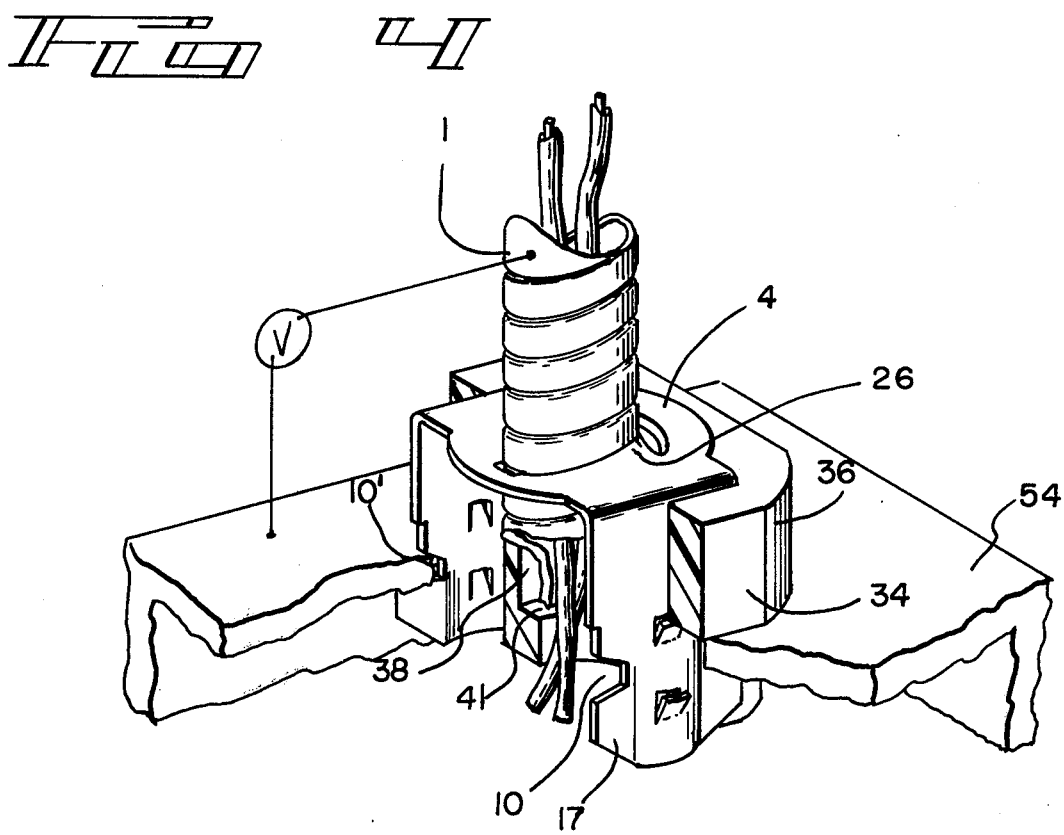
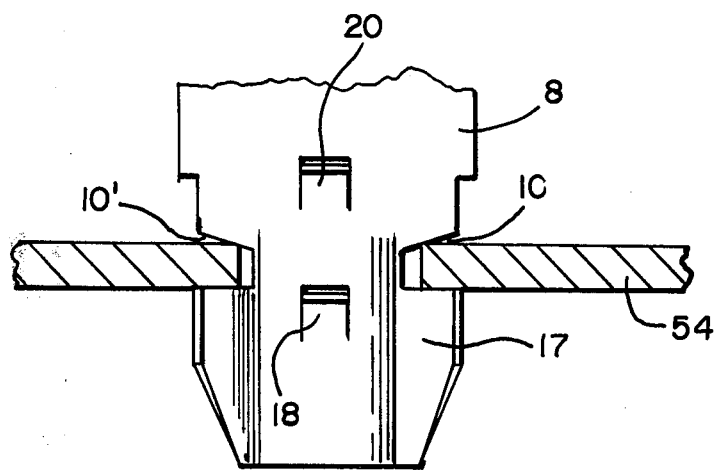

4,021,604

FLEXIBLE CONDUIT CONNECTOR

BACKGROUND OF THE INVENTION

1. Field of the Invention

The present invention relates to an improved snap-in connector for attaching a helically grooved flexible conduit to a panel like member such as an electrical junction box containing a circular hole in one face.

2. Description of the Prior Art

One standard method for connecting a flexible electrical conduit having external helical grooves to a junction box has been to employ a die cast threaded sleeve and nut assembly. Another method has been to employ a snap-in flexible clip assembly. These snap-in assemblies are metallic and are generally tubular in shape. One specific snap-in connector is disclosed in U.S. Pat. No. 3,858,151.

SUMMARY OF THE INVENTION

This invention relates to a connector for attaching helically grooved electrical conduit to a junction box. The connector disclosed herein comprises a substantially flat stamped and formed metallic clip and a rigid housing. This connector can be inserted into a hole in the junction box with the metallic clip providing a resilient latching means. The metallic clip can also be threadably attached to the helically grooved conduit. The rigid housing provides support for the metallic clip as well as completely filling the hole. Similar connector housings for attaching conduits which are either parallel or perpendicular to the junction box are disclosed and claimed.

Among the objects of this invention are the provision of an inexpensive connector employing a stamped and formed metallic clip and an easily molded rigid housing. Additionally, this connector is envisioned as providing a suitable continuous electrical ground as well as a secure mechanical connection. Another object is to provide both a right angle and straight-in version of this connector, both employing an inexpensive clip and housing. A hinged cover is utilized with the right angle version to facilitate easy insertion of the wires contained in the conduit. A further object of this invention is to provide a snap-connector which may be removed without destroying the connector. Finally, this connector is contemplated as providing a reproducible contact with the junction box which is not dependent upon the installer.

BRIEF DESCRIPTION OF THE DRAWING

FIG. 1 shows a helically grooved circuit with a straight-in connector and a right angle connector attached to opposite ends.

FIG. 2 shows a flat stamped blank prior to being formed into a retaining clip.

FIG. 3 shows a telescopic view of the straight-in connector showing the retaining clip with the legs bent downward just above the straight-in housing.

FIG. 4 shows a cut-away view of the straight-in connector inserted into a junction box.

FIG. 5 shows details of the latching means employed with this connector.

DETAILED DESCRIPTION OF THE DRAWING

Figure 6:
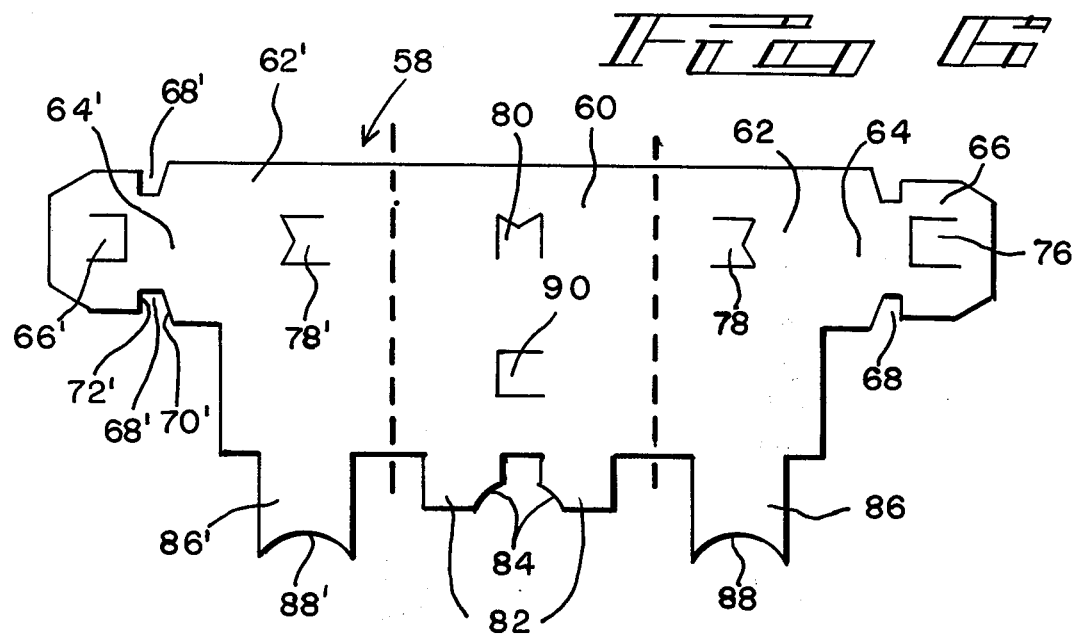
FIG. 6 shows a blank of the right angle retaining clip prior to being fomred into its final configuration.

FIG. 2 shows a stamped blank suitable for forming the straight-in retaining clip. This blank has two legs or sidewalls 8 and 8' on opposite sides of a central web 6. The dashed lines represent fold lines about which the sidewalls will be bent with respect to the central web. Since the two sidewalls are basically the same, corresponding structures on the second sidewall are identified by primed numerals. This practice will be used for the embodiment of FIG. 2 and the embodiment of FIGS. 6 and 8. The central web 6 has a central opening 23 with segments 26 and 28 extending partially therearound. Opposed sidewalls 8 have notches 10, 10' located at a point spaced from the central web. These notches define flap-like members 17 and 17' on the end of each sidewall.

FIG. 3 is a telescoped view showing both the retaining clip 4 and the straight-in housing 34. The two sidewalls 8 and 8' of retaining clip 4 have been bent over with respect to the central web 6 and in this embodiment sides 8 and 8' are essentially parallel to each other and perpendicular to central web portion 6. Each sidewall contains two tabs 18 and 20 which have been struck from the sides thereof. Tab 20 is located between notches 10 and web 6. Tab 18 is located between notches 10 and the end of the sidewall. Each of these tabs is deflected outwardly. The inner portion 16 of the sidewalls proximate to the ends of each sidewall have been curved. The segments 26 and 28 surrounding central opening 23 have been deflected in opposite directions. Segment 26 has been raised with respect to the plane of web 6 and segment 28 has been depressed with respect to web 6. Such opposed deflection causes the innermost edge of central opening 23 formed by the edges of segments 26 and 28 to define a partial helix. This helix is formed because segments 26 and 28 are of varying widths with reference to the circular hole in web 6 defined by the forming operation.

FIG. 3 also shows the straight-in rigid housing 34. This housing has a central passage 40 extending from upper surface 42 to lower surface 44. An enlarged section 36 constitutes the upper half of the housing while a smaller tubular section 38 comprises the lower half. This tubular section has opposed flat surfaces 39, 39'. The enlarged section has slots 46, 46' extending therethrough. These slots are parallel to flat surfaces 39, 39' and to the central passage 40. Tubular section 38 has an outer diameter which is slightly less than that of the opening in the junction box and can be inserted into that opening. Enlarged section 36 will then fit over the junction box opening completely covering it.

FIGS. 1, 4 and 5 show the straight-in connector as used in attaching a helical conduit to one wall of a junction box 54. Each of these figures is a cut-away exposing the action of certain elements of the connector. It can be seen that deflected segments 26 and 28 threadably engage the exterior helical grooves so that the conduit is firmly affixed to the connector. In FIG. 4, the conduit extends into the central internal passage 40 and abuts an interior stop 41 located within tubular section 38. The conductors 3 extend completely through internal passage 40 and the smooth surface of the housing 34 in the neighborhood of stop 41 provides a measure of protection for the insulation on the conductors. These conductors will bear against this smooth surface of the housing and the insulation on the conductors will not be damaged. FIGS. 4 and 5 demonstrate the manner in which the latching means on the retaining clip 4 dig into the wall of junction box 54. The edges of the junction box fit into notches 10 and 10' in the neighborhood of the inner circumference of the circular opening in the junction box. A sufficient electrical connection is established because of the resultant digging action. Tab 18 also digs into the wall of junction box 54 and also prevents the direct removal of the connector from the junction box. Upon examining FIG. 3, it can be seen that latching flaps 17 will be spaced from flat surfaces 39, 39' in the assembled connector. This spacing allows the connector to be removed from the junction box without damaging the connector. Removal is accomplished by inwardly deflecting sidewall portions 8 and 8' until they are in contact with flat surfaces 39 and 39'. When deflected in this manner, tab 18 and notches 10 and 10' no longer engage the wall of the junction box and the connector can be pulled from the hole in the junction box.

In addition to providing a secure mechanical connection between conduit 1 and junction box 54, this connector must also establish an electrical connection between the conduit and the junction box. Such an electrical connection is necessary if the cable and junction box are to serve as a continuous ground. A volt meter is schematically shown in FIG. 4. This volt meter is attached to a point on the conduit and a point on the junction box. This embodiment of the connector is capable of providing an electrical connection which will ensure that if a current of 30 amperes were flowing through the volt meter shown, there would be a voltage drop of not more than 50 milivolts. This is a standard specification for connectors of this type. This specification can be met by using a metallic clip of 24 gauge galvanized steel and a rigid housing of a phenolic plastic. Such a connector can also resist sufficient tensile forces on the conduit and withstand suitable vibration and heat limits.

Figures 7, 8:
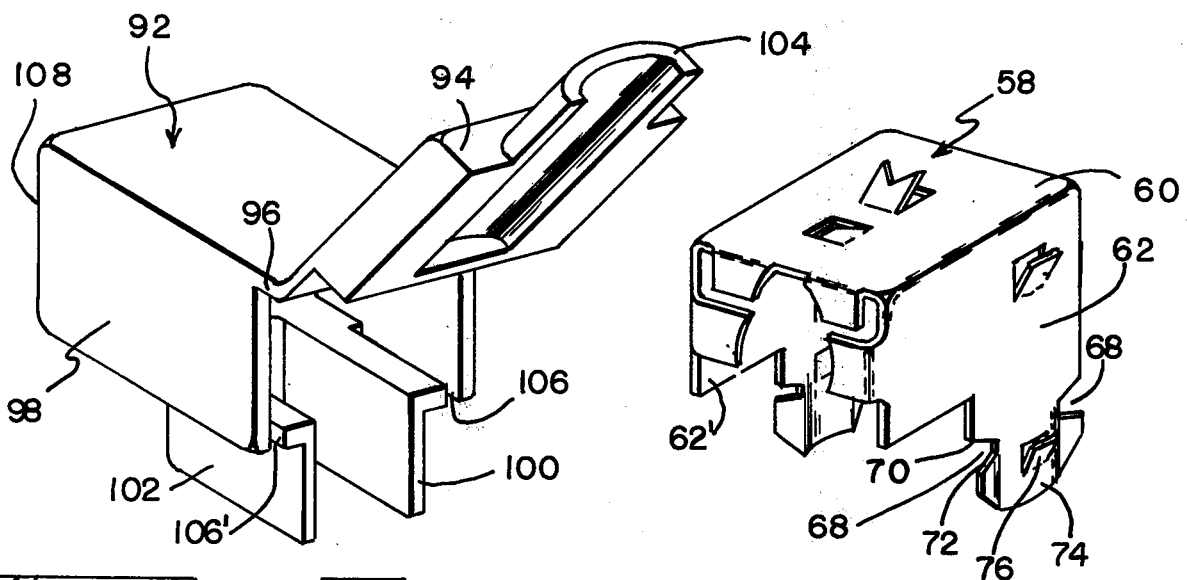
FIG. 7 shows the right angle housing with its hinged cover member.
FIG. 8 shows the right angle retaining clip in its final configuration.

FIGS. 6 and 8 show a metallic retaining clip 58 for use in a right angle version of this connector. FIG. 6 shows a stamped blank prior to being formed into the final configuration shown in FIG. 8. The blank shown in FIG. 6 is bent along the fold lines indicated in FIG. 6 and a number of tabs are struck into the blank at the locations shown. Metallic clip 58 consists of a central web portion 60 with sidewall portions 62, 62' on opposite ends thereof. As with the straight-in version of this connector, the side-wall portions are bent so that they are parallel to each other and perpendicular to web 60. The sidewall portions 62, and 62' have latching legs 64, 64' constituting the ends thereof. These latching legs are essentially the same as the latching means shown in the straight-in version of FIG. 3. They operate in the same manner as discussed in connection with FIGS. 4 and 5. Notches 68 and 68' correspond to notches 10 and 10', flaps 66 and 66' correspond to flaps 17, 17' and tabs 76 and 76' correspond to tabs 18 and 18'.

The means for gripping conduit 1 with the right angle version differs from the central opening 23 of the straight-in clip 4. The right-angle clip 58 has four arms which together serve as the gripping means for the conduit. Two arms 82 extend from the central web portion 60 while arms 86, 86' extend from opposite sidewall portions. Each of these arms is bent as shown in FIG. 8. These arms will then define a helix in such a manner as the deflected segments 26 and 28 for the straight-in version. The external grooves on the conduit can then be screwed into the gripping means formed by the four arms. A tab 90 is struck inwardly from central wall 60 to form a conduit stop. Tabs 78, 78' and 80 are struck outwardly from central web portion 60. These three tabs serve to anchor retaining clip 58 in the right angle housing 92.

Figure 9:
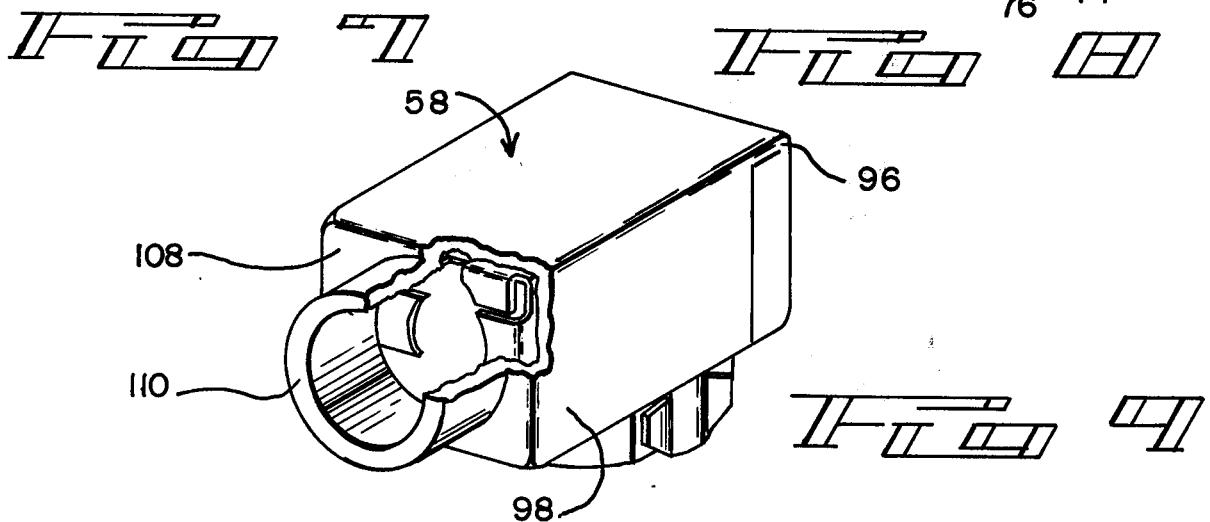
FIG. 9 shows the right angle connector with the retainer clip inserted into the right angle housing.

FIG. 7 shows details of the right angle housing 72. This housing comprises a rectilinear enlarged section 98 and a tubular section 100. Slots 106, 106' are located in the bottom of rectilinear section 98 and are parallel to the flat sides 102, 102' of tubular section 100. Slots 106, 106' receive sidewall portions 62, 62' just as slots 46, 46' receive the straight-in sidewalls. FIG. 9 shows a tubular conduit mating extension 110, extending from the backwall 108 of rectilinear section 98.

An additional feature of the right angle housing is the hinged cover member 94 which serves as the front face of housing 92. A flexible strip 96 attaches cover member 94 to rectiliear section 98. Cover member 94 has a partial tubular section 104 which serves to complete tubular section 100. This hinged cover member facilitates the insertion of wires 3 into the holes in the junction box. These wires can now be bent about a right angle and placed in the internal passage 93 which extends from conduit mating extension 110 through rectilinear section 98 and then through tubular section 100. After wires 3 are bent in this manner, cover member 94 may be rotated to its closed position which is shown in FIG. 9. The connector is then ready for insertion into a hole in the junction box. Note that when the connector is inserted into a junction box, extension 94 will abut the edge of the junction box and any vibration or tension applied will cause any force on member 94 to be supported by the junction box rather than by a flexible strip 96. FIG. 9 also shows that tubular mating extension 110 is dimensioned so that arms 82, 86 and 86' are partially supported by backwall 108.

The two embodiments herein disclosed present the essence of this invention. Other embodiments which would still incorporate the essence of this invention can be readily visualized. For instance a connector incorporating three or more sidewalls would differ from the embodiments shown by only an insignificant detail.

What is claimed is:

1. A connector member for establishing an electrical and mechanical connection between a flexible electrical conduit having helical grooves and a metallic junction box having a circular opening for receipt of said flexible conduit, said connector member comprising:

metallic clip means, said clip means having a central web portion and two sidewall portions, said web portion having an opening therein for receipt of said flexible conduit, each of said sidewall portions having latching means thereon for resiliently establishing contact with the edges of said circular opening on said junction box, and rigid housing means, said housing means having a passage extending therethrough for partial receipt of said flexible conduit and for receipt of the wires contained in said conduit, said housing means having two slots for receipt of said sidewall portions and a tubular extension which may be inserted into said circular opening, the axis of said tubular extension being aligned with said slots so that said latch means may be positioned on opposite sides of said tubular extension, whereby said flexible conduit may be inserted into said opening and secured to said clip means and said tubular extension may in turn be inserted into said opening on said junction box and by the action of said latch means a secure mechanical connection is established and the electrical connection formed allows said junction box and said conduit to serve as a continuous ground.

2. A connector member for establishing an electrical and mechanical connection between a flexible electrical conduit having exterior helical grooves and a panel member, such as a face of a metallic electrical junction box, having a circular opening of a predetermined diameter, said connector member comprising:

a rigid housing for supporting a metallic retaining clip, said rigid housing having a generally tubular section with a diameter substantially equal to, and less than, said predetermined diameter, said tubular section having a specified number of external flat sides, said housing also having an enlarged section for receiving the end of said conduit, said enlarged section having a specified number of slots for receiving said retaining clip, said rigid housing having an internal passage opening onto one surface of said enlarged section and extending through said enlarged section to and through said tubular section, a stamped and formed metallic retaining clip, said retaining clip having a central web portion and a specified number of sidewall portions extending from the periphery of said web portion, said web portion and said sidewall portions being generally flat with said sidewall portions being bent over with respect to said web portion, said sidewall portions being essentially parallel to the axis of said tubular section and perpendicular to said web portion, conduit gripping means on said retaining clip, said gripping means comprising oppositely deflected segments of said retaining clip bent to engage said exterior helical grooves, and latching means on said sidewall portions, said sidewall portions extending through said slots with said latching means thereby being located beside and spaced from said flat sides of said tubular section, said latching means having exposed edges for contacting the inner circumference of said circular opening, whereby said conduit may be mechanically and electrically attached to said junction box so that a continuous ground is established between said conduit and said junction box.

3. A connector member as set forth in claim 2 wherein said metallic retaining clip consists of one integral metal strip.

4. A connector member as set forth in claim 2 wherein said metallic retaining clip has two sidewalls portions extending from opposite sides of said web said sidewalls being parallel to each other and said housing has two slots and two flat sides on said tubular section on opposite sides thereof.

5. A connector member as set forth in claim 2 wherein said internal passage has an internal stop which prevents said flexible conduit from extending completely through said internal passage.

6. A connector member as set forth in claim 2 wherein said conduit gripping means is located in said web portion, said conduit gripping means comprising a hole in said web portion which is aligned with said internal passage with said deflected segments being disposed around said hole in said web portion.

7. A connector means for establishing an electrical and mechanical connection between a flexible electrical conduit having helical grooves and a panel member such as a face of a metallic electrical junction box, having a circular opening of a pre-determined diameter, said conduit extending substantially parallel to said face, said connector member comprising:

a rigid housing having a generally rectilinear section, said rectilinear section having first and second faces, said second face being substantially perpendicular to said first face, said first face having a specified number of slots extending therethrough and said second face having a hole extending therethrough, said hole having a diameter which is substantially equal to, but greater than, the diameter of said conduit, a generally tubular section extending from said first face to said housing, said tubular section having a diameter substantially equal to, but less than, said pre-determined diameter and also having a specified number of external flat surfaces, said external flat surfaces being in alignment with said slots on said first face, a generally right-angular continuous internal passage extending from said hole in said second face to and through said tubular section, a stamped and formed metallic retaining clip having a central web portion and a specified number of sidewall portions extending from the periphery of said web portion, said web portion and said sidewall portions being generally flat with said sidewall portions being bent over with respect to said web portion, said sidewall portions being generally parallel to the axis of said tubular section and generally perpendicular to said web portion, said web portion being positioned on the inside of said housing with said sidewall portions extending through said slots in said first face, conduit gripping means on said retaining clip, said gripping means being positioned on the inside of said housing and adjacent to said second face, and latching means on the ends of said sidewall portions, said latching means being located on the outside of said housing and being beside and spaced from said flat sides of said tubular section, said latching means having exposed edges for contacting the inner circumference of said circular opening, whereby, said conduit may be inserted into said hole in said second face and said gripping means can then secure said conduit while the wires in said conduit pass through said internal passage and into said junction box which has been mechanically and electrically attached to said conduit by the latching means on said connector.

8. A connector member as set forth in claim 7, wherein said rectilinear section has a third face parallel to said first face and adjoining said second face, portions of said third face comprising a hinged cover member, said cover member being attached to said rectilinear section and being movable with respect thereto so as to facilitate passage of said wires through said housing, a part of said cover member bearing against said inner circumference of said circular opening when said connector member is attached to said junction box.

9. A connector member as set forth in claim 7, wherein said gripping means comprise deflected segments of said retaining clip, some of said deflected segments extending from said web portion and the remainder of said deflected segments extending from two of said sidewall portions.

10. In combination with a flexible metallic conduit and an electrical junction box having a circular opening in one face thereof, a connector assembly comprising:
- a rigid housing of electrically insulating material, said housing having a generally tubular portion extending through said circular opening and an enlarged portion located flush against the outer surface of said one face,
- an open-ended internal passage extending through said tubular portion and said enlarged portion, with said conduit extending partially into said internal passage,
- a metallic clip mounted on said housing and having a central web and a plurality of sidewalls extending transversely from the periphery of said web,
- a hole in said central web in alignment with said internal passage, the edges of said hole forming a mechanical and electrically grounding connection with said metallic conduit, and
- gripping edges on said sidewalls forming a mechanical and electrically grounding connection with the edges of said one face, said gripping edges and said enlarged portion acting in conjunction to secure said connector assembly to said one face of said junction box.

* * * * *